US010919010B2

(12) United States Patent
Posthumus (10) Patent No.: US 10,919,010 B2
(45) Date of Patent: Feb. 16, 2021

(54) ELEVATING ANIMAL FEED MIXING SYSTEM

(71) Applicant: Albert Posthumus, Stephenville, TX (US)

(72) Inventor: Albert Posthumus, Stephenville, TX (US)

(73) Assignee: Albert Posthumus, Stephenville, TX (US)

( * ) Notice: Subject to any disclaimer, the term of this patent is extended or adjusted under 35 U.S.C. 154(b) by 321 days.

(21) Appl. No.: 16/008,811

(22) Filed: Jun. 14, 2018

(65) Prior Publication Data

US 2018/0361333 A1 Dec. 20, 2018

Related U.S. Application Data

(60) Provisional application No. 62/519,965, filed on Jun. 15, 2017.

(51) Int. Cl.
| | |
|---|---|
| *B01F 13/00* | (2006.01) |
| *B01F 7/16* | (2006.01) |
| *B01F 15/02* | (2006.01) |
| *B01F 7/24* | (2006.01) |
| *B01F 13/10* | (2006.01) |
| *B01F 15/00* | (2006.01) |
| *A01K 5/00* | (2006.01) |

(52) U.S. Cl.
CPC .......... *B01F 13/0032* (2013.01); *B01F 7/162* (2013.01); *B01F 7/1665* (2013.01); *B01F 7/241* (2013.01); *B01F 15/00954* (2013.01); *B01F 15/0203* (2013.01); *B01F 15/0276* (2013.01); *A01K 5/001* (2013.01); *A01K 5/004* (2013.01); *B01F 13/1041* (2013.01); *B01F 2015/0221* (2013.01); *B01F 2215/0008* (2013.01)

(58) Field of Classification Search
CPC .............. B01F 13/0032; B01F 13/1041; B01F 15/00954; B01F 15/0276; B01F 15/0203; B01F 2215/0008; B01F 2015/0221; A01K 5/001; A01K 5/004
See application file for complete search history.

(56) References Cited

U.S. PATENT DOCUMENTS

| | | | | |
|---|---|---|---|---|
| 3,738,464 A | * | 6/1973 | Ortlip ................. | B65G 69/181 193/25 C |
| 4,125,332 A | * | 11/1978 | Schmednecht ..... | B01F 13/0013 366/33 |
| 4,306,895 A | * | 12/1981 | Thompson ........... | B65G 69/186 193/29 |
| 4,339,204 A | * | 7/1982 | Placzek ................ | B28C 7/0841 366/18 |
| 4,525,070 A | * | 6/1985 | Gressette, Jr. ........ | B28C 5/2054 366/18 |

(Continued)

FOREIGN PATENT DOCUMENTS

WO WO-2011146265 A1 * 11/2011 .......... B01F 15/0276

*Primary Examiner* — Tony G Soohoo
(74) *Attorney, Agent, or Firm* — Foley & Lardner LLP (57) ABSTRACT

An elevating feed mixing system and method are provided. The system includes a support frame and a raisable platform raisable relative to the support frame. A mixing tub disposed on the raisable platform is configured to receive constituent ingredients of a feed and further configured to raise to release the feed after it is mixed.

20 Claims, 7 Drawing Sheets

(56) References Cited

U.S. PATENT DOCUMENTS

| | | | | |
|---|---|---|---|---|
| 5,090,815 A | * | 2/1992 | Bohle | B01F 7/00275 |
| | | | | 222/504 |
| 5,333,799 A | * | 8/1994 | Posthumus | A01F 25/2036 |
| | | | | 241/101.75 |
| 5,411,329 A | * | 5/1995 | Perry | B28C 9/0409 |
| | | | | 366/185 |
| 5,439,653 A | * | 8/1995 | Avila, Sr. | B01F 15/0203 |
| | | | | 222/227 |
| 5,474,379 A | * | 12/1995 | Perry | B28C 5/0868 |
| | | | | 366/185 |
| 6,263,833 B1 | * | 7/2001 | Runyan | A01K 5/00 |
| | | | | 119/51.11 |
| 7,121,715 B1 | * | 10/2006 | Bongratz | B01F 7/021 |
| | | | | 366/192 |
| 8,591,096 B2 | * | 11/2013 | Bongratz | B01F 15/0276 |
| | | | | 366/142 |
| 9,682,352 B2 | * | 6/2017 | Liet | A01K 5/0266 |
| 10,676,296 B2 | * | 6/2020 | Oren | B65G 69/181 |
| 10,750,718 B2 | * | 8/2020 | Posthumus | A01K 5/001 |
| 2010/0326363 A1 | * | 12/2010 | Van Den Berg | A01K 1/105 |
| | | | | 119/57.92 |
| 2016/0023867 A1 | * | 1/2016 | Posthumus | B01F 15/0222 |
| | | | | 366/150.1 |
| 2018/0361333 A1 | * | 12/2018 | Posthumus | B01F 7/241 |

* cited by examiner

ELEVATING ANIMAL FEED MIXING SYSTEM

CROSS REFERENCE TO RELATED APPLICATIONS

This application claims the benefit of and priority to U.S. Provisional Patent Application No. 62/519,965, filed Jun. 15, 2017, and which is incorporated herein by reference in its entirety.

TECHNICAL FIELD

This disclosure relates to transporting and mixing feed for animals, and in particular, to a system and method for efficiently mixing feed.

BACKGROUND OF THE DISCLOSURE

Feed for livestock typically includes a mixture of several different commodities, such as, hay, straw and other types of grain, that when mixed together produce a feed product that is customized to the diet of a group of livestock. The various commodities for a specific feed product are retrieved from bulk commodity locations and then mixed in a large mixer. In practice, commodity transportation vehicles retrieve the required commodities from one or more bulk commodity locations and transport the commodities to the location of the feed mixer. The commodity transportation vehicles, or other commodity loading vehicles such as fork lifts or shovel loaders, then load the commodities into the mixer. When the mixer has fully mixed the commodities, feed transportation vehicles remove the resulting feed from the mixer.

SUMMARY

An elevating feed mixing system is provided. The elevating feed mixing system may include a support frame, a raisable platform raisable relative to the support frame, a mixing tub disposed on the raisable platform and containing a mixer blade configured to mix constituent ingredients of a feed, and a wall shielding at least a portion of the raisable platform and configured to raise and lower with the platform to shield the mixing tub from winds. The raisable platform may be lowered for loading of constituent ingredients into the mixing tub and the raisable platform may be raisable for releasing of constituent ingredients following mixing.

The system may include a second platform connected to the support frame and configured to support liquid ingredient reservoirs configured to release amounts of liquid ingredients into the tub for mixing into the feed.

In various instances, the elevating feed mixing system also includes a second platform connected to the support frame and configured to support liquid ingredient reservoirs configured to release amounts of liquid ingredients into the tub for mixing into the feed.

Moreover, the wall of the elevating feed mixing system may include wall panels. For example, the wall may include a first wall panel, a second wall panel, and a third wall panel. The first wall panel may extend upwardly from an edge frame of the raisable platform. The second wall panel may extend upwardly from the edge frame of the raisable platform and join to the first wall panel. The third wall panel may extend upwardly from the edge frame of the raisable platform and may join to the second wall panel. The first wall panel and the third wall panel may be joined together by loading opening support bars crossing a loading opening defined between the first wall panel and the third wall panel through which the mixing tub is loadable with the constituent ingredients of the feed.

The elevating feed mixing system may also include wherein the raisable platform has an edge frame disposed outwardly of a perimeter of the support frame and wherein the support frame has legs extending through the raisable platform inward of the edge frame.

In some instances, the raisable platform is connected to the support frame by a platform raising mechanism configured to raise and lower the raisable platform relative to the support frame. The platform raising mechanism may be a plurality of hydraulic cylinders.

The elevating feed mixing system may further include wherein the support frame has a first leg, a second leg, a third leg, and a fourth leg, wherein each leg extends upwardly at a corner of the raisable platform, and wherein the raisable platform connects to each leg by a platform raising mechanism configured to raise and lower the raisable platform. Moreover, a second platform may be disposed upwardly of the raisable platform and connecting to the first leg, the second leg, the third leg, and the fourth leg in fixed position. The first leg, the fourth leg, and the second platform may define sides of a loading opening through which the mixing tub is loadable with the constituent ingredients of the feed.

Moreover, the support frame may also include a roof spaced apart from the second platform. The roof and the second platform may define an enclosed space, and at least one liquid ingredient reservoir may be disposed in the enclosed space and may be configured to release a liquid into the mixing tub. In addition, an electronic variable speed drive may be disposed in the enclosed space.

The elevating feed mixing system may include an electric motor. The mixer blade may be is driven by the electric motor in response to the electronic variable speed drive.

One may further appreciate that the raisable platform may have inward support bars extending from the edge frame inward of the edge frame and supporting a mixing tub.

A method of feed mixing is provided. The method may include lowering a mixing tub disposed on a raisable platform raisable relative to a support frame, depositing constituent ingredients of a feed into the mixing tub, shielding the mixing tub from winds by a wall shielding at least a portion of the raisable platform and configured to raise and lower with the platform, mixing, by a mixer blade, the constituent ingredients of the feed in the mixing tub, raising the mixing tub relative to the support frame, and releasing the feed from the raised mixing tub.

A method of making an elevating feed mixing system is provided. The method may include providing a support frame, providing a raisable platform raisable relative to the support frame, providing a mixing tub disposed on the raisable platform and containing a mixer blade configured to mix constituent ingredients of a feed, and providing a wall shielding at least a portion of the raisable platform and configured to raise and lower with the platform to shield the mixing tub from winds. In various embodiments, the raisable platform is lowered for loading of constituent ingredients into the mixing tub. In various embodiments, the raisable platform is raisable for releasing of constituent ingredients following mixing.

The method of making the elevating feed mixing system may also include providing a second platform connected to the support frame and configured to support liquid ingredient reservoirs configured to release amounts of liquid ingredients into the tub for mixing into the feed.

Moreover, the method may include wherein providing the wall includes providing a first wall panel, providing a second wall panel, and providing a third wall panel. Moreover the first wall panel may extend upwardly from an edge frame of the raisable platform. The second wall panel may extend upwardly from the edge frame of the raisable platform and be joined to the first wall panel. The third wall panel may extend upwardly from the edge frame of the raisable platform and be joined to the second wall panel. In various instances, the first wall panel and the third wall panel are joined together by loading opening support bars crossing a loading opening defined between the first wall panel and the third wall panel through which the mixing tub is loadable with the constituent ingredients of the feed.

The method of making the elevating feed mixing system may include wherein providing the raisable platform includes providing an edge frame disposed outwardly of a perimeter of the support frame, and wherein providing the support frame includes providing legs extending through the raisable platform inward of the edge frame.

The method of making the elevating feed mixing system may include wherein providing the raisable platform further features providing inward support bars extending from the edge frame inward of the edge frame and supporting a mixing tub.

The method of making the elevating feed mixing system may include wherein the raisable platform is connected to the support frame by a platform raising mechanism configured to raise and lower the raisable platform relative to the support frame.

Furthermore, the method of making the elevating feed mixing system may include wherein providing the support frame includes providing a first leg, a second leg, a third leg, and a fourth leg, wherein each leg extends upwardly at a corner of the raisable platform, wherein the raisable platform connects to each leg by a platform raising mechanism configured to raise and lower the raisable platform, wherein providing the support frame further includes providing a second platform disposed upwardly of the raisable platform and connecting to the first leg, the second leg, the third leg, and the fourth leg in fixed position, wherein providing the support frame further includes providing a roof spaced apart from the second platform, wherein the roof and the second platform define an enclosed space, and wherein at least one liquid ingredient reservoir is provided in the enclosed space and configurable to release a liquid into the mixing tub.

Other aspects, features, and advantages will become apparent from the following detailed description when taken in conjunction with the accompanying drawings, which are part of this disclosure and which illustrate, by way of example, principles of the inventions disclosed.

DESCRIPTION OF THE FIGURES

The accompanying drawings facilitate an understanding of the various embodiments.

DETAILED DESCRIPTION

FIGS. 1-7 illustrate embodiments of an elevating animal feed mixing system and method. In various embodiments, a mixing tub 4 containing mixer blades 18-1, 18-2, such as first mixer blades 18-1 and a second mixer blades 18-2, and an electric motor 20 is mounted to a raisable platform 6. The raisable platform 6 can be lowered, and the constituent ingredients of animal feed can be dumped into the tub, where it is mixed. The raisable platform 6 is then raised, such as by hydraulic cylinders and a platform raising motor 40 of a platform raising mechanism 10. A wind shield 8 provides a wall that surrounds at least a portion of the raisable platform 6 and is configured to raise and lower with the raisable platform 6 and to shield the mixing tub 4 from winds. The wall travels, for instance, on the outside of the support frame 12 as the raisable platform 6 raises relative to the support frame 12. In this manner, the wind shield 8 including wall panels 22-1, 22-2, 22-3 provide a wind shield to prevent the constituent ingredients from blowing away during loading when the raisable platform 6 is down.

Upon raising of the raisable platform 6, a vehicle 50 such as a truck or other vehicle may drive underneath the raisable platform 6 between the legs 24-1, 24-2, 24-3, and 24-4 of the support frame 12 and the mixed animal feed is released from the mixing tub 4 into the vehicle 50 for transporting.

Moreover, within the support frame 12, an enclosed space 26 underneath and/or within the roof 30 of the support frame 12 provides a second platform 28 for the support of liquid ingredient reservoirs 14. For instance, a water tank 32, a whey tank 34, or other tanks as needed are disposed on the second platform 28 within the enclosed space 26 and are configured to release amounts of liquid ingredients into the mixing tub 4 for mixing into the animal feed. Additionally, an electronic variable speed drive 16 is disposed on the second platform 28 and is connected with electrical cable(s) to the electric motor(s) 20-1, 20-2 of the mixing tub 4 that drives the mixer blades 18-1, 18-2. The liquid ingredients may be released into the mixing tub 4 when the mixing tub 4 is down (see FIG. 5, elevating animal feed mixing system 2 in lowered position 200). In further embodiments, the liquid ingredients are released into the mixing tub 4 when the mixing tub 4 is up (see FIG. 5, elevating animal feed mixing system 2 in raised position 100). In yet further embodiments, the liquid ingredients are releasable into the tub when the tub is down 100 and when the tub is up 200.

Now having addressed various aspects of an elevating animal feed mixing system 2 generally, specific attention will be directed to various components thereof. With reference to FIGS. 1-3 and 6, an elevating animal feed mixing system 2 is provided. An elevating animal feed mixing system 2 may be configured to mix components of a feed and selectably elevate an aspect of the elevating animal feed mixing system 2 to facilitate delivery of mixed animal feed to a vehicle 50.

The elevating animal feed mixing system 2 includes a mixing tub 4. A mixing tub 4 comprises a reservoir to receive commodity material for mixing. In various instances, a mixing tub 4 may have a single set of mixer blades, such as mixer blades 18-1. In various further instances, a mixing tub 4 may have multiple sets of mixer blades, such as mixer blades 18-1, 18-2, as depicted. Moreover, mixer blades may comprise augers, impellers, propellers, paddles, rods, combs, and or the like as may be desired to facilitate mixing of various different materials as desired.

In various instances, the mixing tub 4 may also have a motor 20, which may be an electric motor. In various instances, an internal combustion engine, and/or a hydraulically driven motor may be provided. Moreover, in various instances a motor 20 may be shared by a plurality of mixer blades, such as mixer blades 18-1 and 18-2, whereas in further instances separate motors 20 may be associated with separate mixer blades.

The mixing tub 4 may have a mixed commodity release 46. A mixed commodity release 46 may include a selectably openable passage whereby a mixed commodity product, such as animal feed, is released from the mixing tub 4, such as into a vehicle 50. A mixing tub 4 may have a plurality of mixed commodity releases 46, for example, one proximate to first mixer blades 18-1 and another proximate to second mixer blades 18-2.

The elevating animal feed mixing system 2 may also include a raisable platform 6 as mentioned. The raisable platform 6 may provide a supporting surface for the mixing tub 4. The raisable platform 6 may translate upward and downward, or along another direction or combination of direction as desired. The raisable platform 6 may comprise one or more inside support bars 42 within an edge frame 44. For example, an edge frame 44 may comprise a collection of bars that form a closed shape around the perimeter of the support frame 12. The edge frame 44 may be movable in at least one direction relative to the support frame 12. For example, the edge frame 44 may be slidable upwardly and downwardly as the support frame 12 passes within the edge frame 44.

In various embodiments, the raisable platform 6 comprises one or more inside support bar 42. An inside support bar 42 may extend inwardly from the edge frame 44 into the interior of the closed shape formed by the edge frame 44. The one or more inside support bar 42 may provide at least one point of contact with the mixing tub 4 such as to support and/or stabilize the mixing tub 4. One or more inside support bar 42 may extend entirely across the interior of the closed shape of the edge frame 44, attaching at both ends to the edge frame 44 but positioned in non-interfering relation with the support frame 12 for at least a portion of the travel of the edge frame 44 relative to the support frame 12.

The elevating animal feed mixing system 2 may also include a wind shield 8. A wind shield 8 may comprise a structure configured to shield the mixing tub 4 from a wind, for instance, to prevent a commodity product such as animal feed from blowing out of the mixing tub 4. The wind shield 8 may comprise one or more wall panels 22-1, 22-2, 22-3. One or more wall panels 22-1, 22-2, 22-3 may comprise one or more sheet of material disposed in connection with the raisable platform 6. For instance, one or more wall panels 22-1, 22-2, 22-3 may be connected to the edge frame 44 of the raisable platform 6 outside of the support frame 12. In various instances, one or more wall panels 22-1, 22-2, 22-3 may comprise a corrugated sheet, such as corrugated metal, though in further instances a flat sheet is implemented. One or more wall panels 22-1, 22-2, 22-3 may comprise metal, or plastic, mesh, or any other material configured to ameliorate loss of mixable material from the mixing tub 4. For instance, as depicted in FIGS. 1-5, a first wall panel 22-1, a second wall panel 22-3, and a third wall panel 22-3 are implemented, each wall corresponding to a side of a trapezoidal raisable platform 6. A fourth side of the trapezoidal raisable platform 6 does not have a corresponding wall, thereby providing a loading opening 38 through the support frame 12 through which the mixing tub 4 may be loaded with materials to be mixed. In various embodiments, loading opening support bars 36-1, 36-2, such as a first loading opening support bar 36-1 and a second loading opening support bar 36-2, extend across a portion of the loading opening 38 and interconnect the first wall panel 22-1 and the third wall panel 22-3 to provide structural support to the first wall panel 22-1 and the third wall panel 22-3 in the absence of an interconnecting fourth wall therebetween. In further embodiments, such as wherein the mixing tub 4 is loaded via a further mechanized release tube, auger, bucket, or other feature, no opening is required, such that a fourth wall is implemented.

The elevating animal feed mixing system 2 may also comprise a platform raising mechanism 10 configured to raise and lower the raisable platform 6 relative to the support frame 12. As such, the platform raising mechanism 10 may comprise aspects interconnecting the raisable platform 6 and the support frame 12, whereas in further instances, the platform raising mechanism 10 extends between the raisable platform 6 and the ground or another aspect configured to support the raisable platform 6. In various embodiments, the platform raising mechanism 10 comprises hydraulic cylinders, for instance, one at each corner of the raisable platform 6 and attached to the support frame 12. In further instances, the platform raising mechanism 10 comprises cables, pulleys, linear actuators, rack and pinion and or other mechanisms configured to raise and/or lower the raisable platform 6 as desired.

Figure 1:
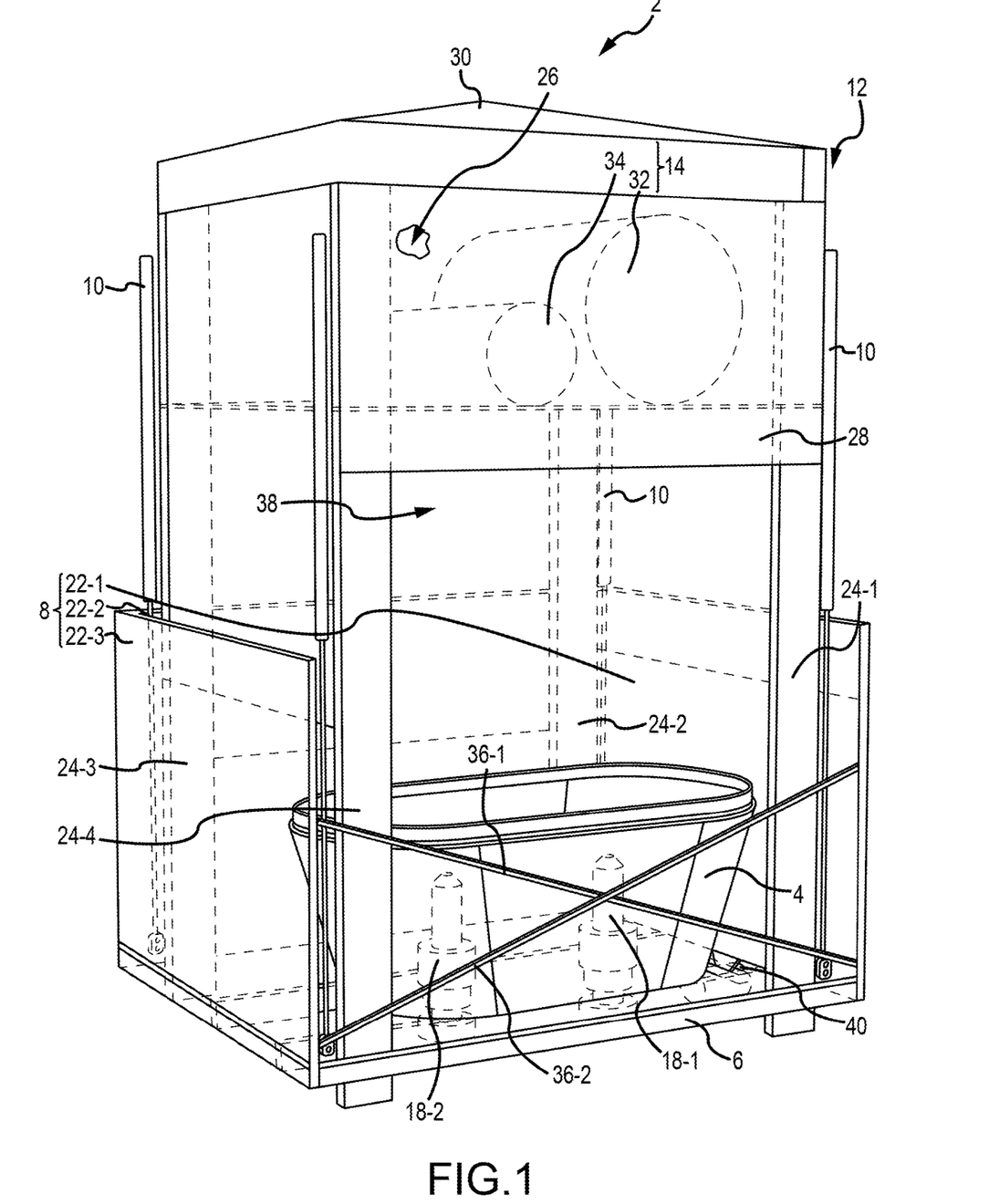
FIG. 1 shows a front side view of an elevating animal feed mixing system, in accordance with various embodiments.
Figure 3:
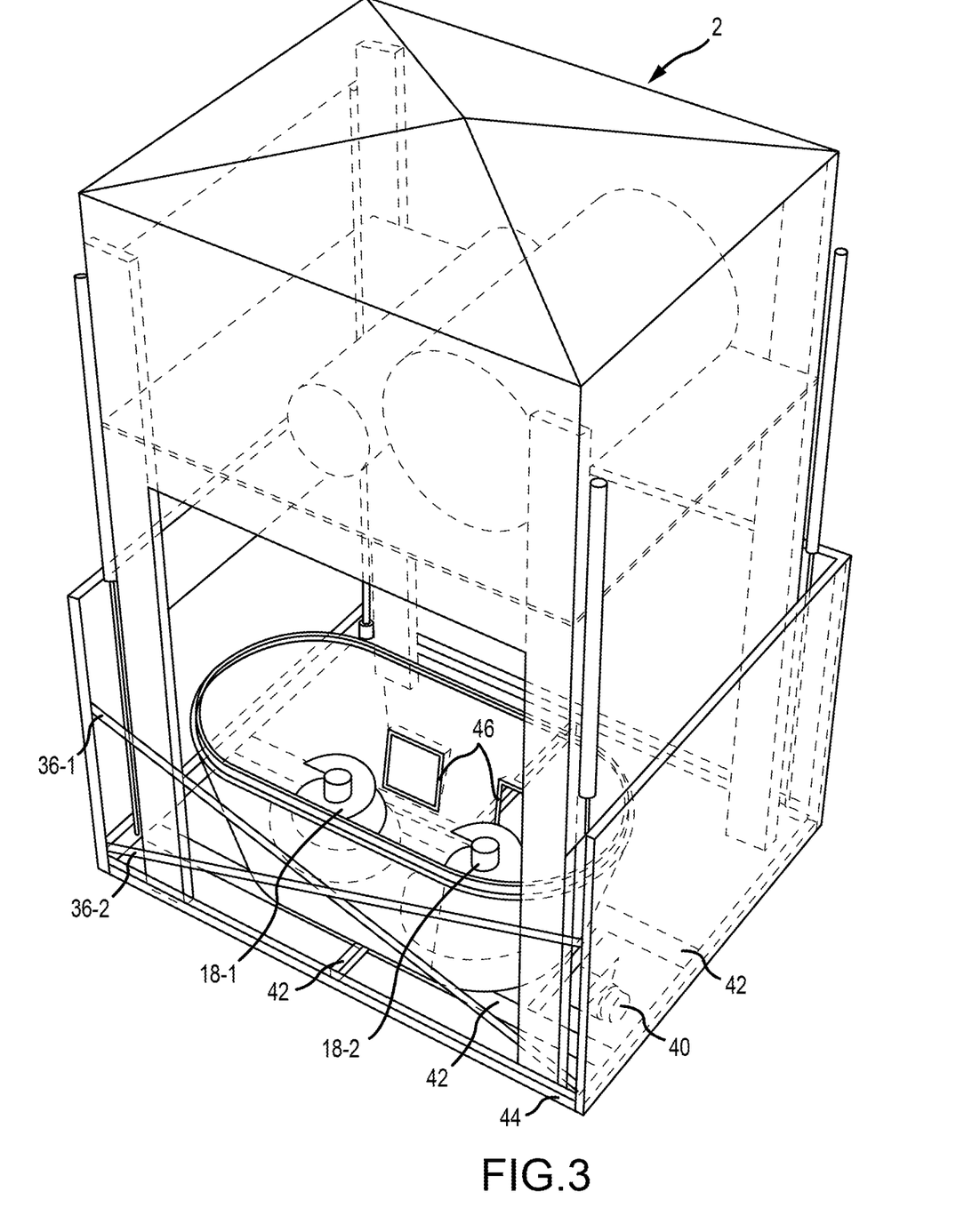
FIG. 3 shows a front perspective view of an elevating animal feed mixing system, in accordance with various embodiments.
Figure 6:
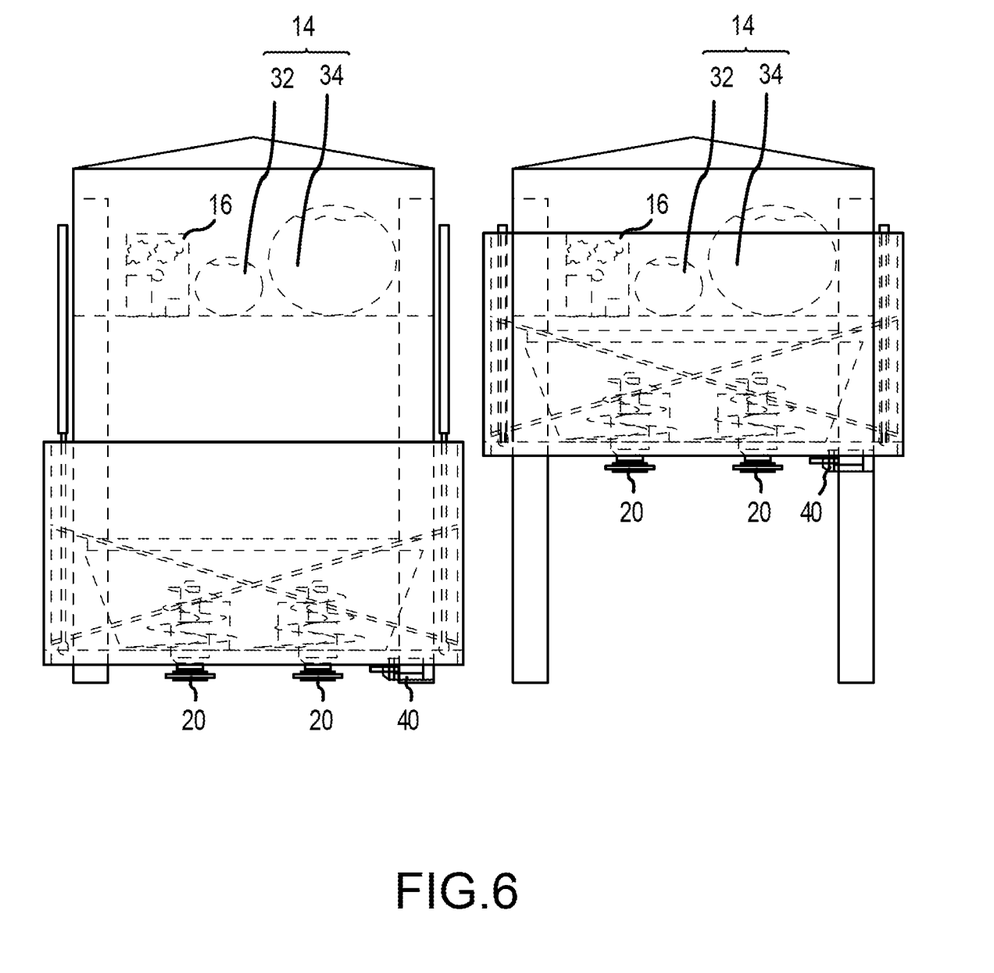
FIG. 6 shows a section view of a first elevating animal feed mixing system in a lowered configuration and a second elevating animal feed mixing system in a raised configuration, in accordance with various embodiments.

With reference to FIGS. 1, 3, and 6, the elevating animal feed mixing system 2 may further comprise a platform raising motor 40. The platform raising motor 40 may comprise an electrical motor in conjunction with a hydraulic pump. In further instances, the platform raising motor 40 comprises any force exerting device as desired. For example, the platform raising motor 40 may comprise an internal combustion engine, and/or any other motive force providing mechanism as desired.

Figure 2:
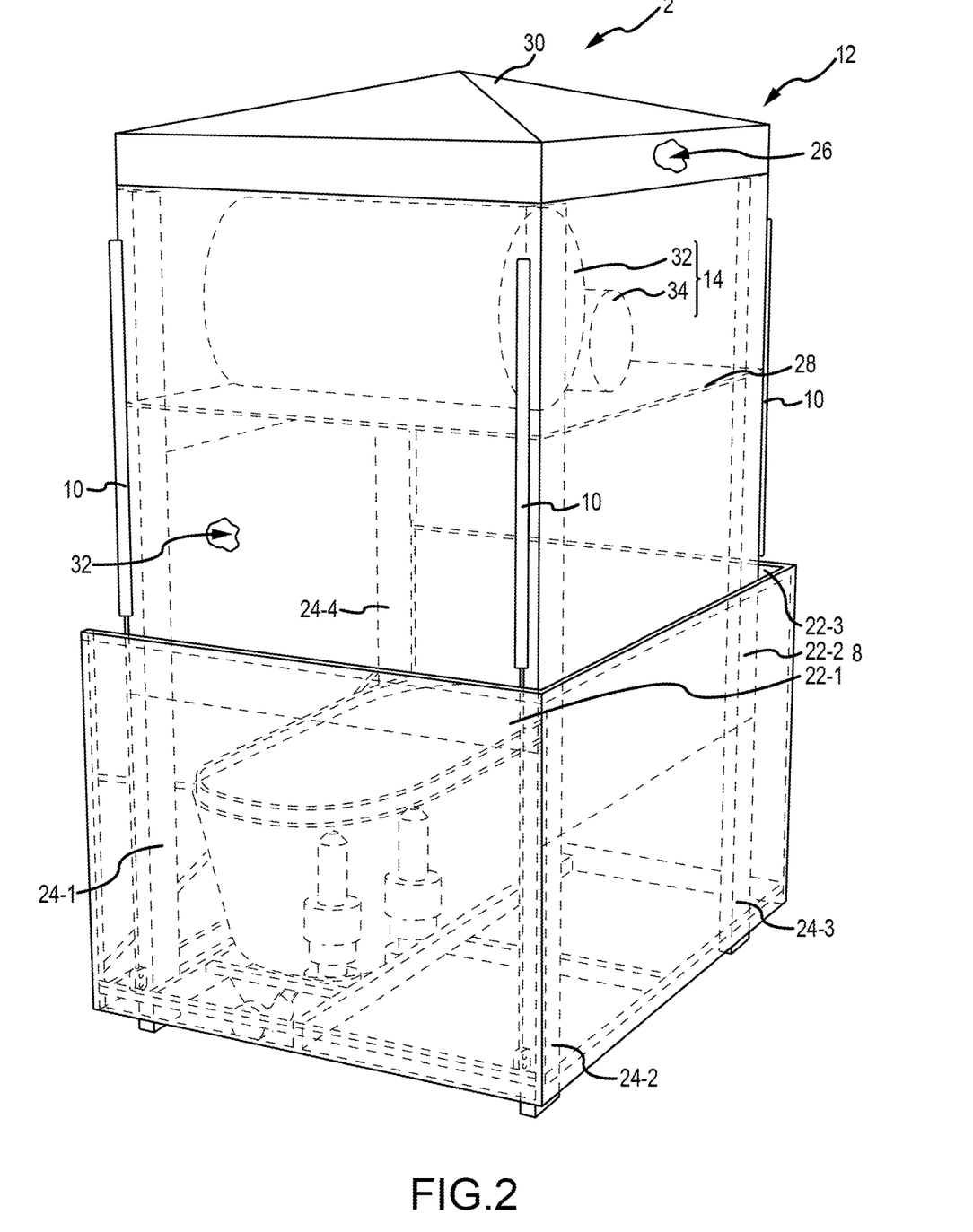
FIG. 2 shows a rear side view of an elevating animal feed mixing system, in accordance with various embodiments.
Figure 4:
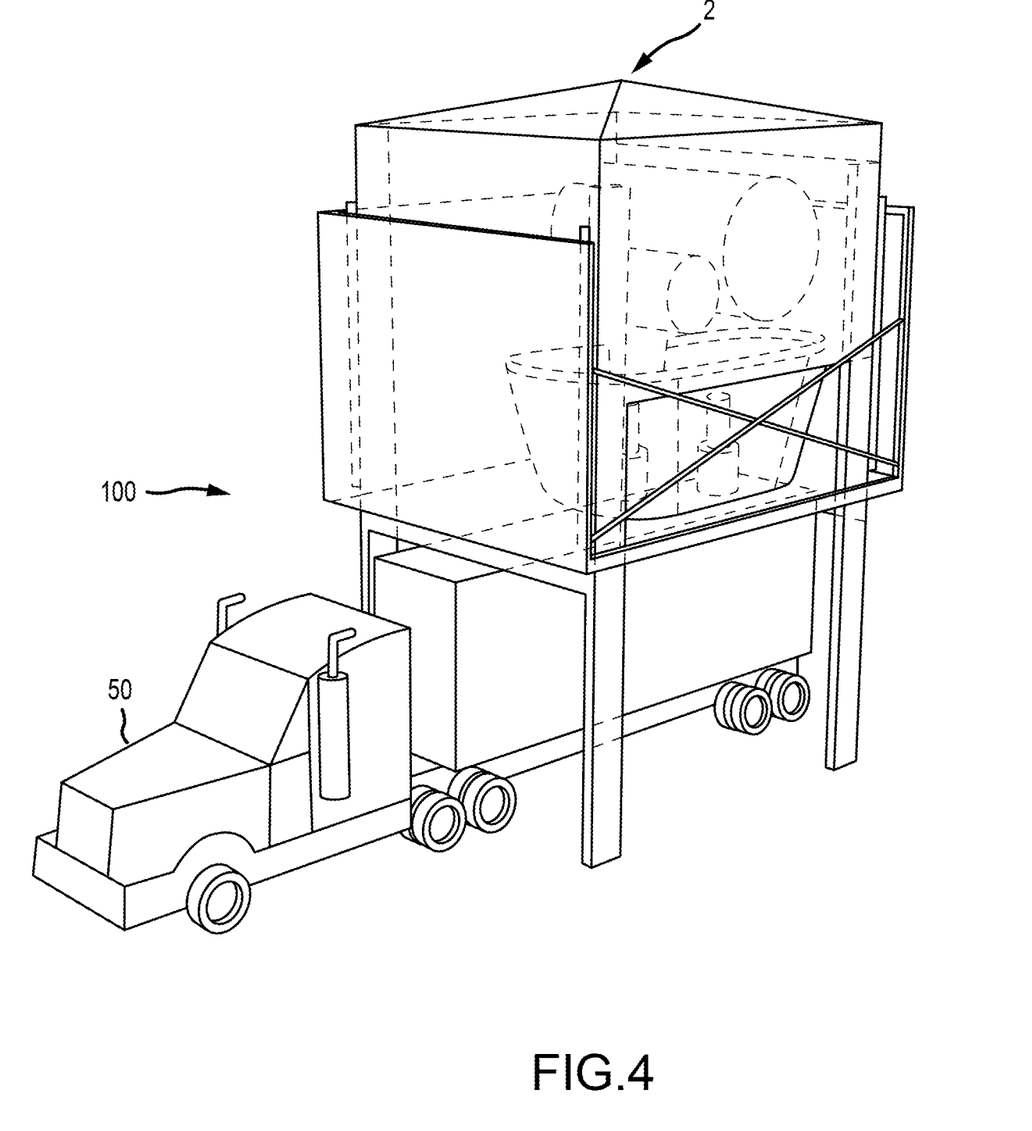
FIG. 4 shows an elevating animal feed mixing system in a raised configuration, in accordance with various embodiments.
Figure 5:
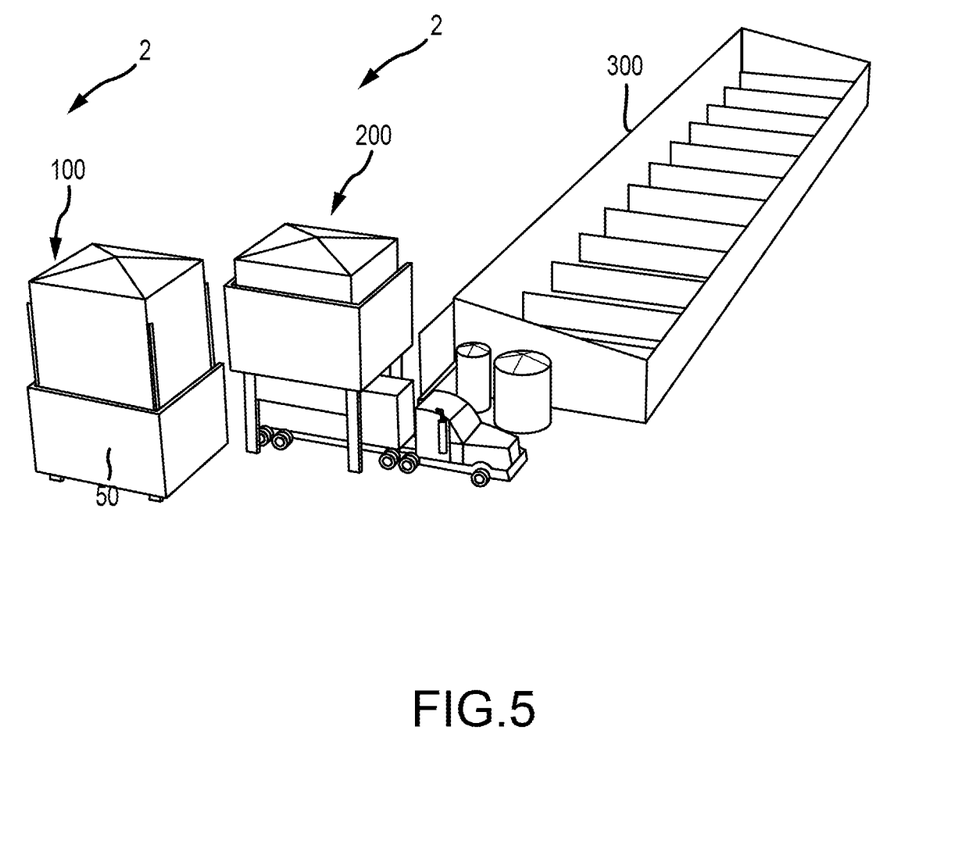
FIG. 5 shows a first elevating animal feed mixing system in a lowered configuration, a second elevating animal feed mixing system in a raised configuration, and a barn, in accordance with various embodiments.

With reference to FIGS. 1, 2, and 3, the elevating animal feed mixing system 2 may comprise a support frame 12 as mentioned. The support frame 12 comprises a structure configured to support the raisable platform 6 in a raised position 100 (FIGS. 4, 5) or in a lowered position 200 (FIGS. 4, 5). For instance, the support frame 12 may comprise legs 24-1, 24-2, 24-3, and 24-4, such as a first leg 24-1, a second leg 24-2, a third leg 24-3, and a fourth leg 24-4. In further embodiments, different numbers of legs may be contemplated. The legs 24-1, 24-2, 24-3, and 24-4 comprise upwardly extending supports restable on a surface, such as the ground. In various instances, such as wherein the raisable platform 6 is trapezoidal, each of the legs 24-1, 24-2, 24-3, and 24-4 is positioned near a different corner of the raisable platform 6. In various instances, the wind shield 8 travels outside of the legs 24-1, 24-2, 24-3, and 24-4 relative to the raisable platform 6, whereas in further instances, the wind shield 8 travels inward of the legs 24-1, 24-2, 24-3, and 24-4 relative to the raisable platform 6. Similarly, while the edge frame 44 of the raisable platform 6 is depicted extending outwardly of the legs 24-1, 24-2, 24-3, and 24-4, in further instances, the edge frame 44 of the raisable platform 6 may be inward of the legs 24-1, 24-2, 24-3, and 24-4.

The support frame 12 may further include a second platform 28. The second platform 28 may be supported in fixed position in connection to the legs 24-1, 24-2, 24-3, and 24-4 above the highest point of travel of the raisable platform 6 and/or the combination of the raisable platform 6 and the mixing tub 4. The second platform 28 may be configured to support further aspects of the elevating animal feed mixing system 2, such as liquid ingredient reservoirs 14 and/or an electronic variable speed drive 16 as discussed further herein.

The second platform 28 may define a floor of an enclosed space 26 between the second platform 28 and a roof 30 and within the perimeter of the legs 24-1, 24-2, 24-3, 24-4 of the support frame 12. For example, the roof 30 may comprise an uppermost covering aspect of the elevating animal feed mixing system 2 and a second platform 28 may be fixed below the roof 30. Surrounding the enclosed space 26 defined by the roof 30 and the second platform 28, walls may enclose the sides of the enclosed space 26. In various embodiments, these walls are downward extending panels of the roof 30.

The support frame 12 may define a loading opening 38. A loading opening 38 may include a passage defined into an interior space of the support frame 12 whereby the mixing tub 4 may be loaded with commodity product(s) to be mixed. The loading opening 38 may be defined between legs. For instance, the first leg 24-1 and the fourth leg 24-4 may define sides of the loading opening 38, and the second platform 28 and the ground may define sides of the loading opening 38. The loading opening 38 thus may correspond to a portion of the wind shield 8 not occluded by wall panels 22-1, 22-2, 22-3, for instance, the portion of the wind shield 8 partially occupied by loading opening support bars 36.

As mentioned, one or more liquid ingredient reservoirs 14 may be disposed in the enclosed space 26, as shown in FIGS. 1, 2, and 6. A water tank 32 and/or a whey tank 34 may be provided. Similarly, an electronic variable speed drive 16 may be disposed in the enclosed space 26. The electronic variable speed drive 16 may connect to the electric motor(s) 20 associated with the mixer blade(s) 18-1, 18-2 in order to control the speed, direction, acceleration, and/or other aspects of the behavior of the mixer blade(s) 18-1, 18-2.

With reference to FIGS. 1, 4 and 5, an elevating animal feed mixing system 2 may have different positions. For example, an elevating animal feed mixing system 2 may have a lowered position 200 wherein the raisable platform 6 is lowered proximate to the ground and may have a raised position 100 wherein the raisable platform 6 is raised away from the ground. The raised position 100 may permit a vehicle 50 to pass under the raised raisable platform 6 and/or adjacent to the raised raisable platform 6 such as for unloading of commodity products from the mixing tub 4 into the vehicle 50. In various embodiments, constituent components of a mixed commodity product are stored in a barn 300. The components are transferred from the barn 300 to the mixing tub 4 for mixing (e.g., the mixing tub 4 is loaded), and subsequently released from the mixing tub 4 into a vehicle 50 (e.g., the mixing tub 4 is unloaded). In various instances, the elevating animal feed mixing system 2 is located near to the barn 300, and in further instances, the elevating animal feed mixing system 2 is inside the barn 300.

Figure 7:
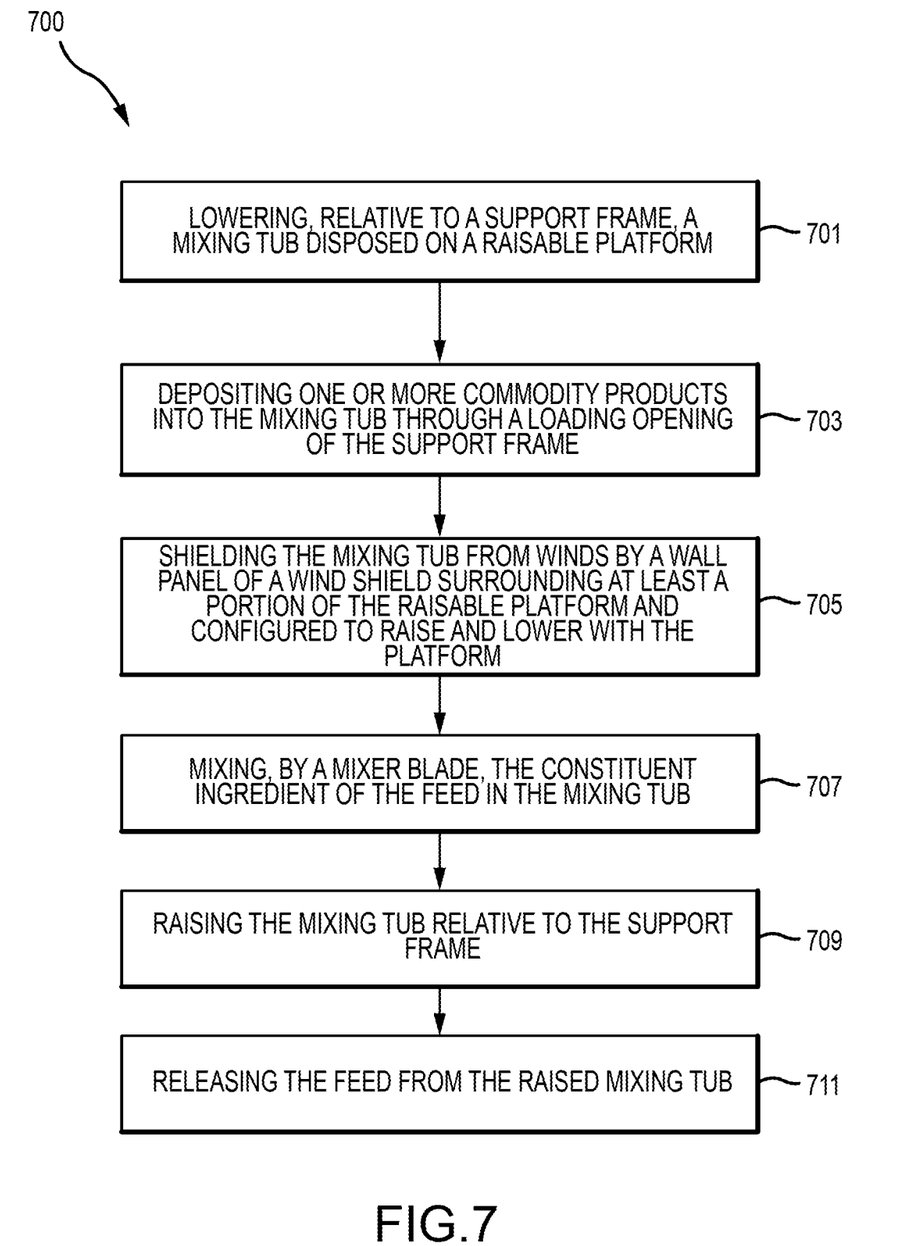
FIG. 7 shows an elevating animal feed mixing method, in accordance with various embodiments.

Having discussed specific aspects of an elevating animal feed mixing system 2, attention is now directed to FIGS. 1-7, but with primary reference to FIG. 7 to discuss operation of an elevating animal feed mixing system 2. A method 700 of using an elevating animal feed mixing system 2 is provided. An elevating animal feed mixing system 2 may be positioned in a loading position. For instance, the raisable platform 6 may be positioned at a lowered position 200 by the platform raising mechanism 10. Stated differently, a mixing tub 4 disposed on a raisable platform 6 may be lowered relative to a support frame 12 (step 701).

One or more commodity products, such as constituent ingredients of an animal feed, desired to be mixed may be deposited into the mixing tub 4, such as through a loading opening 38 of the support frame 12 (step 703).

The contents of the mixing tub 4 may be shielded from blowing out of the mixing tub 4 by a wind shield 8 which is translatable in connection with the raisable platform 6. For example, the raisable platform 6 may be connected to the wind shield 8 and the wind shield 8 may translate corresponding to the positioning of the raisable platform 6 at a lowered position 200 and at a raised position 100. Stated differently, the step may include shielding the mixing tub 4 from winds by wall panel(s) 22-1, 22-2, 22-3 of a wind shield 8 shielding at least a portion of the raisable platform 6 and configured to raise and lower with the platform (step 705).

The commodity product(s) may be mixed by mixer blades 18-1, 18-2 of the mixing tub 4, for instance, under the impartation of motive force from one or more motor 20. Thus the method 700 may include mixing, by a mixer blade, such as first mixer blade 18-1 and/or second mixer blade 18-2, the constituent ingredients of the feed in the mixing tub 4 (step 707).

The raisable platform 6 may be positioned at a raised position 100 configured to permit passage of a vehicle 50 under or adjacent to the mixing tub 4 associated with the raisable platform 6. Consequently, the method 700 may include raising the mixing tub 4 relative to the support frame 12 (step 709).

The contents of the mixing tub 4 may be released through a mixed commodity release 46 from the mixing tub 4 into the vehicle 50. Thus, the method 700 may further include releasing the feed from the raised mixing tub 4 (step 711).

While various steps are depicted sequentially, one may appreciate that at least a portion of the disclosed steps may occur in parallel (e.g., at the same time, or at overlapping periods of time), and/or may occur in different sequences, as desired.

Thus, one may appreciate that various benefits of the disclosed systems and methods may include that the time and expense of digging a vehicle pit beneath a mixer so that a vehicle may pass under the mixer to received released mixed animal feed is saved because the system and method includes a raisable platform. Moreover, by eliminating the need for a conveyor and/or conveyor ramp, maintenance issues, material waste, and system size are all reduced. Yet furthermore, the accumulation of waste ingredients and the associated sanitation challenges associated with a non-raisable system and method are ameliorated. Even further, maintenance, repair, and replacement is expedited as aspects may be removed and replaced by lowering of the raisable ramp onto a vehicle or vehicle trailer and subsequent transportation such as during repair and/or replacement of parts.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. For example, while reference is made to "animal feed" herein, one may appreciate that other compositions of matter facilitated by mixing of constituent ingredients may be contemplated.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. An elevating feed mixing system comprising:
   a support frame;
   a raisable platform raisable relative to the support frame;
   a mixing tub disposed on the raisable platform and containing a mixer blade configured to mix constituent ingredients of a feed; and
   a wall shielding at least a portion of the raisable platform and configured to raise and lower with the platform to shield the mixing tub from wind,
   wherein the raisable platform is lowered for loading of constituent ingredients into the mixing tub, and
   wherein the raisable platform is raisable for releasing of constituent ingredients following mixing.

2. The elevating feed mixing system according to claim 1, further comprising a second platform connected to the support frame and configured to support liquid ingredient reservoirs configured to release amounts of liquid ingredients into the tub for mixing into the feed.

3. The elevating feed mixing system according to claim 1, wherein the wall comprises:
   a first wall panel extending upwardly from an edge frame of the raisable platform;
   a second wall panel extending upwardly from the edge frame of the raisable platform and joined to the first wall panel; and
   a third wall panel extending upwardly from the edge frame of the raisable platform and joined to the second wall panel; and
   wherein the first wall panel and the third wall panel are joined together by loading opening support bars crossing a loading opening defined between the first wall panel and the third wall panel through which the mixing tub is loadable with the constituent ingredients of the feed.

4. The elevating feed mixing system according to claim 1, wherein the raisable platform comprises an edge frame disposed outwardly of a perimeter of the support frame, wherein the support frame comprises legs extending through the raisable platform inward of the edge frame.

5. The elevating feed mixing system according to claim 4, wherein the raisable platform further comprises inward support bars extending from the edge frame inward of the edge frame and supporting the mixing tub.

6. The elevating feed mixing system according to claim 1, wherein the platform raising mechanism comprises a plurality of hydraulic cylinders.

7. The elevating feed mixing system according to claim 1, wherein the raisable platform is connected to the support frame by a platform raising mechanism configured to raise and lower the raisable platform relative to the support frame.

8. The elevating feed mixing system according to claim 7, wherein the support frame comprises a first leg, a second leg, a third leg, and a fourth leg,
   wherein each leg extends upwardly at a corner of the raisable platform,
   wherein the raisable platform connects to each leg by the platform raising mechanism configured to raise and lower the raisable platform,
   wherein a second platform is disposed upwardly of the raisable platform and connecting to the first leg, the second leg, the third leg, and the fourth leg in fixed position.

9. The elevating feed mixing system according to claim 8, wherein the first leg, the fourth leg, and the second platform define sides of a loading opening through which the mixing tub is loadable with the constituent ingredients of the feed.

10. The elevating feed mixing system according to claim 8, wherein the support frame further comprises a roof spaced apart from the second platform,
    wherein the roof and the second platform define an enclosed space, and
    wherein at least one liquid ingredient reservoir is disposed in the enclosed space and configured to release a liquid into the mixing tub.

11. The elevating feed mixing system according to claim 10, further comprising an electronic variable speed drive in the enclosed space.

12. The elevating feed mixing system according to claim 11, further comprising:
    an electric motor, and
    wherein the mixer blade is driven by the electric motor in response to the electronic variable speed drive.

13. A method of feed mixing comprising:
    lowering a mixing tub disposed on a raisable platform raisable relative to a support frame;
    depositing constituent ingredients of a feed into the mixing tub;
    shielding the mixing tub from winds by a wall shielding at least a portion of the raisable platform and configured to raise and lower with the platform;
    mixing, by a mixer blade, the constituent ingredients of the feed in the mixing tub;
    raising the mixing tub relative to the support frame; and
    releasing the feed from the raised mixing tub.

14. A method of making an elevating feed mixing system comprising:
    providing a support frame;
    providing a raisable platform raisable relative to the support frame;
    providing a mixing tub disposed on the raisable platform and containing a mixer blade configured to mix constituent ingredients of a feed; and
    providing a wall shielding at least a portion of the raisable platform and configured to raise and lower with the platform to shield the mixing tub from winds,
    wherein the raisable platform is lowered for loading of constituent ingredients into the mixing tub, and wherein the raisable platform is raisable for releasing of constituent ingredients following mixing.

15. The method of making the elevating feed mixing system according to claim 14, further comprising providing a second platform connected to the support frame and configured to support liquid ingredient reservoirs configured to release amounts of liquid ingredients into the tub for mixing into the feed.

16. The method of making the elevating feed mixing system according to claim 14,
wherein providing the wall comprises:
providing a first wall panel extending upwardly from an edge frame of the raisable platform;
providing a second wall panel extending upwardly from the edge frame of the raisable platform and joined to the first wall panel; and
providing a third wall panel extending upwardly from the edge frame of the raisable platform and joined to the second wall panel; and
wherein the first wall panel and the third wall panel are joined together by loading opening support bars crossing a loading opening defined between the first wall panel and the third wall panel through which the mixing tub is loadable with the constituent ingredients of the feed.

17. The method of making the elevating feed mixing system according to claim 14,
wherein providing the raisable platform comprises providing an edge frame disposed outwardly of a perimeter of the support frame, and
wherein providing the support frame comprises providing legs extending through the raisable platform inward of the edge frame.

18. The method of making the elevating feed mixing system according to claim 17,
wherein providing the raisable platform further comprises providing inward support bars extending from the edge frame inward of the edge frame and supporting the mixing tub.

19. The method of making the elevating feed mixing system according to claim 14,
wherein the raisable platform is connected to the support frame by a platform raising mechanism configured to raise and lower the raisable platform relative to the support frame.

20. The method of making the elevating feed mixing system according to claim 19,
wherein providing the support frame comprises providing a first leg, a second leg, a third leg, and a fourth leg,
wherein each leg extends upwardly at a corner of the raisable platform,
wherein the raisable platform connects to each leg by a platform raising mechanism configured to raise and lower the raisable platform,
wherein providing the support frame further comprises providing a second platform disposed upwardly of the raisable platform and connecting to the first leg, the second leg, the third leg, and the fourth leg in fixed position,
wherein providing the support frame further comprises providing a roof spaced apart from the second platform,
wherein the roof and the second platform define an enclosed space, and
wherein at least one liquid ingredient reservoir is provided in the enclosed space and is configurable to release a liquid into the mixing tub.

* * * * *